(12) United States Patent
Rao et al.

(10) Patent No.: US 11,861,459 B2
(45) Date of Patent: Jan. 2, 2024

(54) AUTOMATIC DETERMINATION OF SUITABLE HYPER-LOCAL DATA SOURCES AND FEATURES FOR MODELING

(71) Applicant: INTERNATIONAL BUSINESS MACHINES CORPORATION, Armonk, NY (US)

(72) Inventors: Rajendra Rao, Los Gatos, CA (US); Rajesh Phillips, Bangalore (IN); Manisha Sharma Kohli, Subhash Nagar (IN); Puneet Sharma, Bangalore Karnata (IN); Vijay Ekambaram, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 16/437,477

(22) Filed: Jun. 11, 2019

(65) Prior Publication Data
US 2020/0394551 A1    Dec. 17, 2020

(51) Int. Cl.
*G06N 5/022* (2023.01)
*G06N 5/04* (2023.01)
(Continued)

(52) U.S. Cl.
CPC ......... *G06N 20/00* (2019.01); *G06F 16/9024* (2019.01); *G06F 21/6209* (2013.01); *G06N 5/022* (2013.01); *G06N 5/04* (2013.01)

(58) Field of Classification Search
CPC .......... G06N 20/00; G06N 5/022; G06N 5/04; G06F 16/9024; G06F 21/6209; G06F 21/6227
See application file for complete search history.

(56) References Cited

U.S. PATENT DOCUMENTS

2017/0221010 A1*  8/2017  Brdiczka .............. G06F 40/205
2018/0218303 A1   8/2018  Cole et al.
(Continued)

FOREIGN PATENT DOCUMENTS

WO    2017185020 A1   10/2017

OTHER PUBLICATIONS van der Waa, J., Robeer, M., van Diggelen, J., Brinkhuis, M., & Neerincx, M. (2018). Contrastive explanations with local foil trees. arXiv preprint arXiv: 1806.07470. (Year: 2018).*

(Continued)

*Primary Examiner* — Kamran Afshar
*Assistant Examiner* — Lokesha G Patel
(74) *Attorney, Agent, or Firm* — CANTOR COLBURN LLP; Steven Bouknight

(57) ABSTRACT

Methods, systems and computer program products for providing automatic determination of recommended hyper-local data sources and features for use in modeling is provided. Responsive to training each model of a plurality of models, aspects include receiving client data, a use-case description and a selection of hyper-local data sources, generating a client data profile, determining feature importance and generating a use-case profile. Aspects also include generating a feature profile relation graph including client data profile nodes, hyper-local feature nodes and a use-case profile nodes, wherein each hyper-local feature node is associated with one or more client data profile nodes and user-case profile nodes by a respective edge having an associated edge weight. Responsive to receiving a new client data set and a new use-case description, aspects also include determining one or more hyper-local features as suggested hyper-local features for use in building a new model.

18 Claims, 6 Drawing Sheets

(51) Int. Cl.
*G06N 20/00* (2019.01)
*G06F 21/62* (2013.01)
*G06F 16/901* (2019.01)

(56) References Cited

U.S. PATENT DOCUMENTS

| | | | |
|---|---|---|---|
| 2018/0223805 A1 | 8/2018 | Badrinath Krishna et al. | |
| 2018/0342020 A1 | 11/2018 | Sen et al. | |
| 2019/0156210 A1* | 5/2019 | He | G06F 16/903 |
| 2021/0049441 A1* | 2/2021 | Bronstein | G06N 3/0445 |

OTHER PUBLICATIONS

Wu, H., Wang, C., Tyshetskiy, Y., Docherty, A., Lu, K., & Zhu, L. (2019). Adversarial examples on graph data: Deep insights into attack and defense. arXiv preprint arXiv: 1903.01610. (Year: 2019).*

Anonymous, "A Brief History of Machine Learning Models Explainability," Medium, Sep. 25, 2018, URL: https://medium.com/@Zelros/a-brief-history-of-machine-learning-models-explainability-f1c3301be9dc; Retrieved on May 10, 2019, 8 pages.

Anonymous, "A Beginner's Guide to Word2Vec and Neural Word Embeddings," Skymind, URL: https://skymind.ai/wiki/word2vec; Retrieved on May 10, 2019, 9 pages.

Anonymous, "Market Potential and Sales Forecasting," MKT 455 Marking Strategy and Analytics; URL: http://academic.udayton.edu/JohnSparks/strategy/webnotes/forecasting.pdf; Retrieved on Apr. 3, 2019; 12 pages.

Giering, "Retail Sales Prediction and Item Recommendations Using Customer Demographics at Store Level," SIGKDD Explorations, vol. 10, Iss. 2, Dec. 2018, pp. 84-89.

Manning, "Representations for Language: From Word Embeddings to Sentence Meanings," Stanford University, URL: https://nlp.stanford.edu/manning/talks/Simons-Institute-Manning-2017.pdf; Retrieved Apr. 3, 2019; 68 pages.

Quora, "How to Determine Feature Importance in a Predictive Model," Quora.com; URL: https://www.quora.com/How-do-you-determine-feature-importance-in-a-predictive-model; Retrieved on Apr. 3, 2019; 2 pages.

Wikipedia, "Knowledge Representation and Reasoning," URL: https://en.wikipedia.org/wiki/Knowledge_representation_and_reasoning; Retrieved on May 10, 2019, 8 pages.

* cited by examiner

AUTOMATIC DETERMINATION OF SUITABLE HYPER-LOCAL DATA SOURCES AND FEATURES FOR MODELING

BACKGROUND

The present invention generally relates to processing systems, and more specifically, to providing automatic determination of recommended hyper-local data sources and features for use in modeling.

Workbench software platforms provide users with the capability to generate models based on client data (i.e., data provided by the user) and common data sources such as hyper-local data sources. For example, native multi-dimensional hyper-local data sources may include neighborhood profiles, seasonal factors, shopper demographics, social influences, brand affinity, purchase trends and other such data that may be provided on a granular, local level. Client side data-scientists can feed in their data sources into a workbench software platform and use the software platform's capabilities to build predictive models that fuse the client data together with the native hyper-local data. Such workbench software platforms commonly do not allow such confidential native hyper-local data to be copied by the client outside of the sandbox provided by the platform.

SUMMARY

Embodiments of the present invention are directed to a computer-implemented method for providing automatic determination of recommended hyper-local data sources and features for use in modeling. A non-limiting example of the computer-implemented method includes, in response to training each model of a plurality of models using a software platform, receiving client data, a use-case description and a selection of hyper-local data sources to be used in the model from a user associated with the model. The hyper-local data sources may be accessible by the software platform. The method also includes generating a client data profile based on the client data. The method also includes determining a feature importance for each feature of a plurality of features associated with the selected hyper-local data sources. The method also includes generating a use-case profile based on the use-case description. The method also includes generating a feature profile relation graph based on a plurality of determined client data profiles, a plurality of determined feature importances associated with features associated with hyper-local data sources, and a plurality of determined use-case profiles. The feature profile graph may include a plurality of client data profile nodes, a plurality of hyper-local feature nodes and a plurality of use-case profile nodes. Each hyper-local feature node of the plurality of hyper-local feature nodes may be associated with one or more client data profile nodes and one or more user-case profile nodes by a respective edge having an associated edge weight. Responsive to receiving a new client data set and a new use-case description, the method includes determining one or more hyper-local features as suggested hyper-local features for use in building a new model based on the new client data set, the new use-case description and the feature profile relation graph.

Embodiments of the present invention are directed to a system for providing automatic determination of recommended hyper-local data sources and features for use in modeling. The system includes a memory having computer readable computer instructions, and a processor for executing the computer readable instructions. The computer readable instructions include instructions for, in response to training each model of a plurality of models using a software platform, receiving client data, a use-case description and a selection of hyper-local data sources to be used in the model from a user associated with the model. The hyper-local data sources may be accessible by the software platform. The computer readable instructions also include instructions for generating a client data profile based on the client data. The computer readable instructions also include instructions for determining a feature importance for each feature of a plurality of features associated with the selected hyper-local data sources. The computer readable instructions also include instructions for generating a use-case profile based on the use-case description. The computer readable instructions also include instructions for generating a feature profile relation graph based on a plurality of determined client data profiles, a plurality of determined feature importances associated with features associated with hyper-local data sources, and a plurality of determined use-case profiles. The feature profile graph may include a plurality of client data profile nodes, a plurality of hyper-local feature nodes and a plurality of use-case profile nodes. Each hyper-local feature node of the plurality of hyper-local feature nodes may be associated with one or more client data profile nodes and one or more user-case profile nodes by a respective edge having an associated edge weight. Responsive to receiving a new client data set and a new use-case description, the computer readable instructions include instructions for determining one or more hyper-local features as suggested hyper-local features for use in building a new model based on the new client data set, the new use-case description and the feature profile relation graph.

Embodiments of the invention are directed to a computer program product for providing automatic determination of recommended hyper-local data sources and features for use in modeling, the computer program product comprising a computer readable storage medium having program instructions embodied therewith. The computer readable storage medium is not a transitory signal per se. The program instructions are executable by a processor to cause the processor to perform a method. A non-limiting example of the method includes in response to training each model of a plurality of models using a software platform, receiving client data, a use-case description and a selection of hyper-local data sources to be used in the model from a user associated with the model. The hyper-local data sources may be accessible by the software platform. The method also includes generating a client data profile based on the client data. The method also includes determining a feature importance for each feature of a plurality of features associated with the selected hyper-local data sources. The method also includes generating a use-case profile based on the use-case description. The method also includes generating a feature profile relation graph based on a plurality of determined client data profiles, a plurality of determined feature importances associated with features associated with hyper-local data sources, and a plurality of determined use-case profiles. The feature profile graph may include a plurality of client data profile nodes, a plurality of hyper-local feature nodes and a plurality of use-case profile nodes. Each hyper-local feature node of the plurality of hyper-local feature nodes may be associated with one or more client data profile nodes and one or more user-case profile nodes by a respective edge having an associated edge weight. Responsive to receiving a new client data set and a new use-case description, the method includes determining one or more hyper-local features as suggested hyper-local features for use in building a new model based on the new client data set, the new use-case description and the feature profile relation graph.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
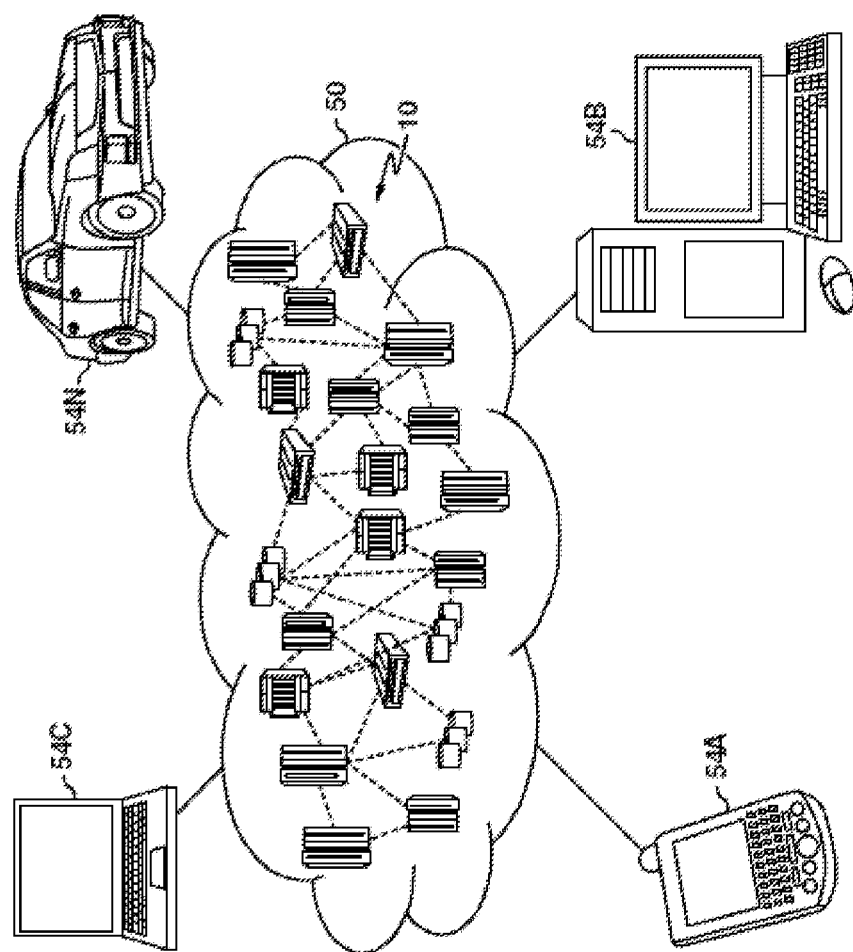
FIG. 1 depicts a cloud computing environment according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
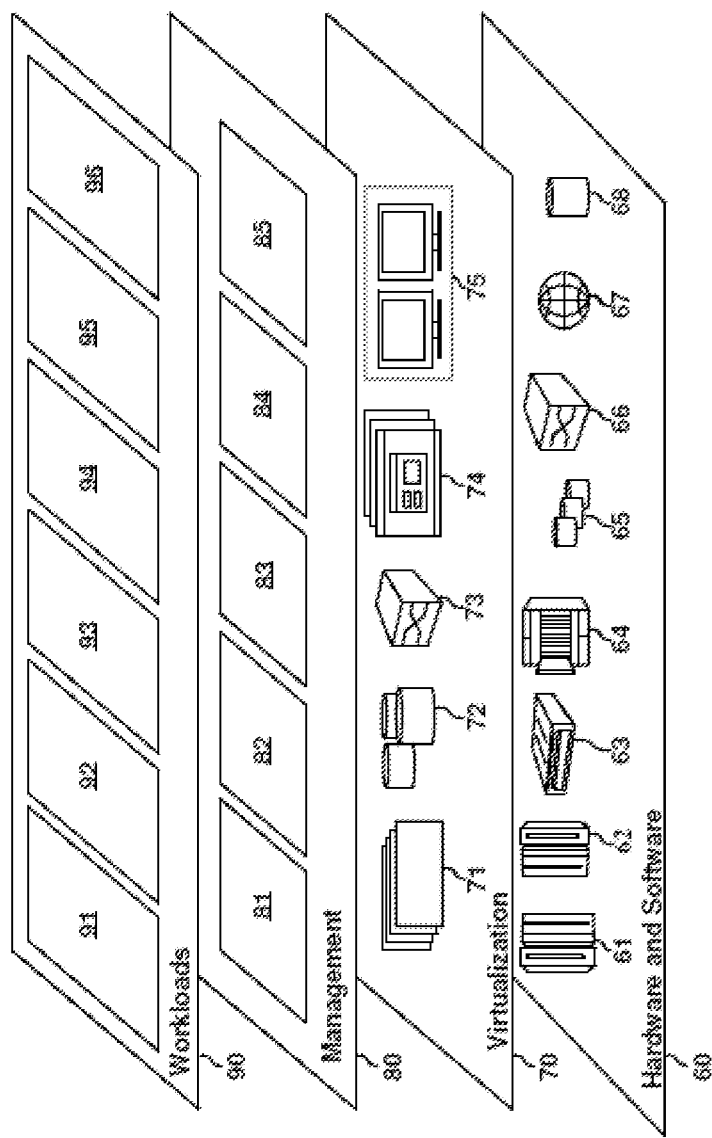
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing automatic determination of recommended hyper-local data sources and features for use in modeling 96.

Figure 3:
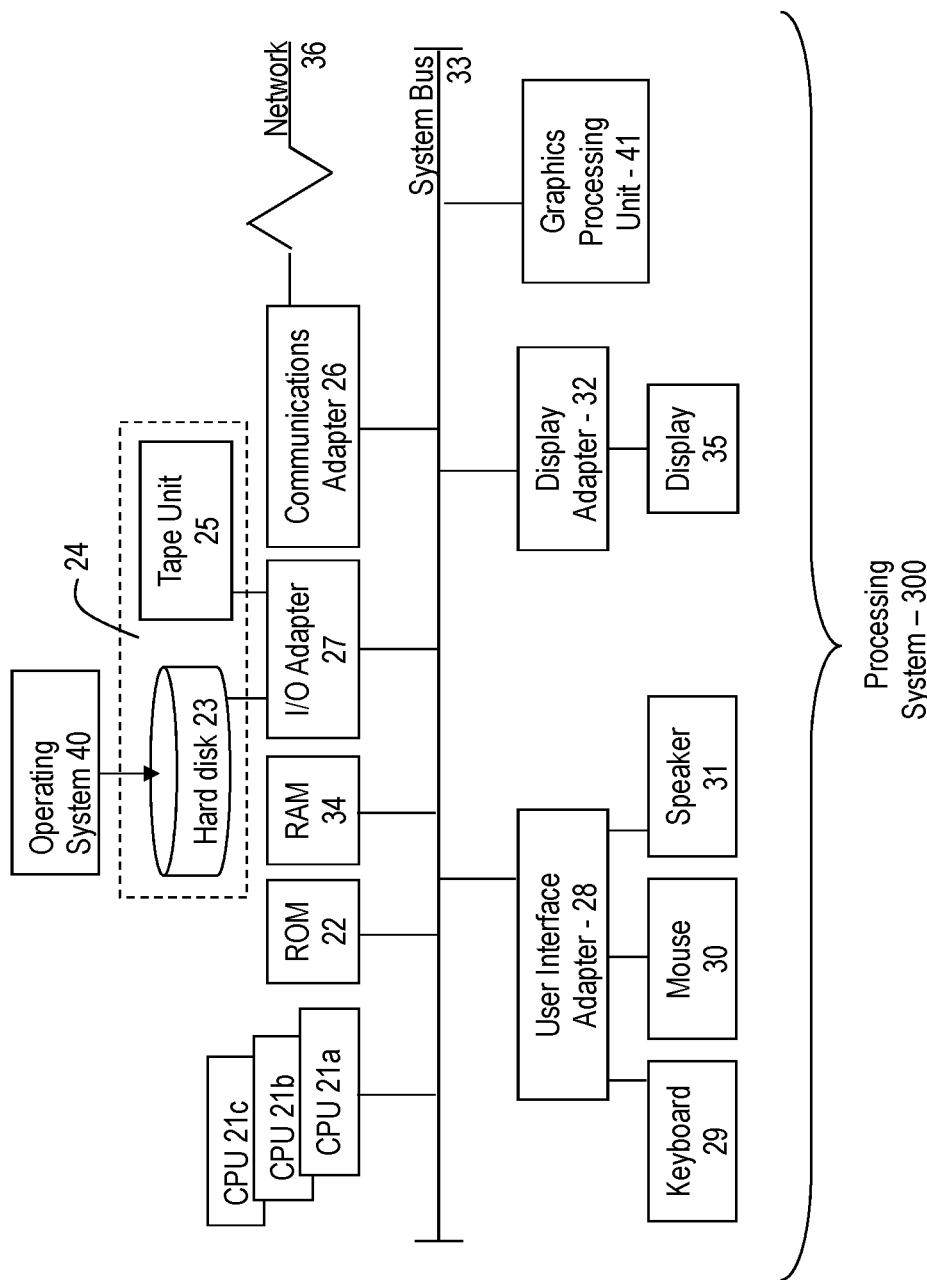
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing automatic determination of recommended hyper-local data sources and features for use in modeling is provided. In exemplary embodiments, the systems, methods, and techniques disclosed herein may allow for the automatic identification or one or more hyper-local features to be used in a generating a predictive model on a workbench software platform based on the client data provided and a description of the use-case. The term workbench software platform is used herein to describe a software platform that provides modeling tools to allow a user to generate and train a model based on user-submitted client data (e.g., sales data, product inventory data, etc.) as well as hyper-local data provided by the platform. The techniques described herein may be implemented in conjunction with, but not limited to, for example, IBM's Metropulse Analytics Workbench. Traditionally, workbench software platforms may provide users with access to hyper-local data sources that may be combined with user-submitted client data in generating and/or training a model.

As will be understood by those of skill in the art, hyper-local data sources may include data sources relating to local activity, such as for example, a neighborhood profile, seasonal factors, shopper demographers, social influences, brand affinity, purchase trends, and other such types of data that correspond to particular locations or locals. Each hyper-local data source may include number features. For example, demographic hyper-local data sources may feature of tax distribution, average population/unit, income, and the like. As will be appreciated by those of skill in the art, different data sources and different features may be useful in generating different models based on different use-cases and different client data. Thus, selection of appropriate data sources and/or features can be critical to the performance of the model. However, such hyper-local data sources are commonly confidential and users may not be permitted to copy or export the hyper-local data sources, which can prevent a user from performing an analysis on the hyper-local data sources and features to attempt to develop any insights that may assist with improved feature selection for model training.

Aspects of the present invention attempt to solve the problem of data source/feature selection for the generation of models by generating a feature profile relation graph that provides an indication of the strength of relationships between different features and client data profiles and use-case profiles. The feature profile relation graph may be generated over time based on various models trained on the workbench software platform by different users and can be updated based on every new model that is trained on the platform. When similar relationships between features and data profiles are observed in different models, those relationships within the feature profile relationship graph may be strengthened. When a user desires to create a new model, the user may input the client data and an indication of the use-case into the system, and the system may automatically determine and rank the best hyper-local features for use in the new model, by identifying which hyper-local features in the feature profile relation graph have the strongest ties to data profiles and use-cases similar to those of the new model. In this way, the system may remove the guesswork in selecting hyper-local features for use in a new model, allowing users to generate more accurate models with less effort, while also preserving the integrity and confidentiality of the hyper-local data sources provided by the workbench software platform.

Figure 4:
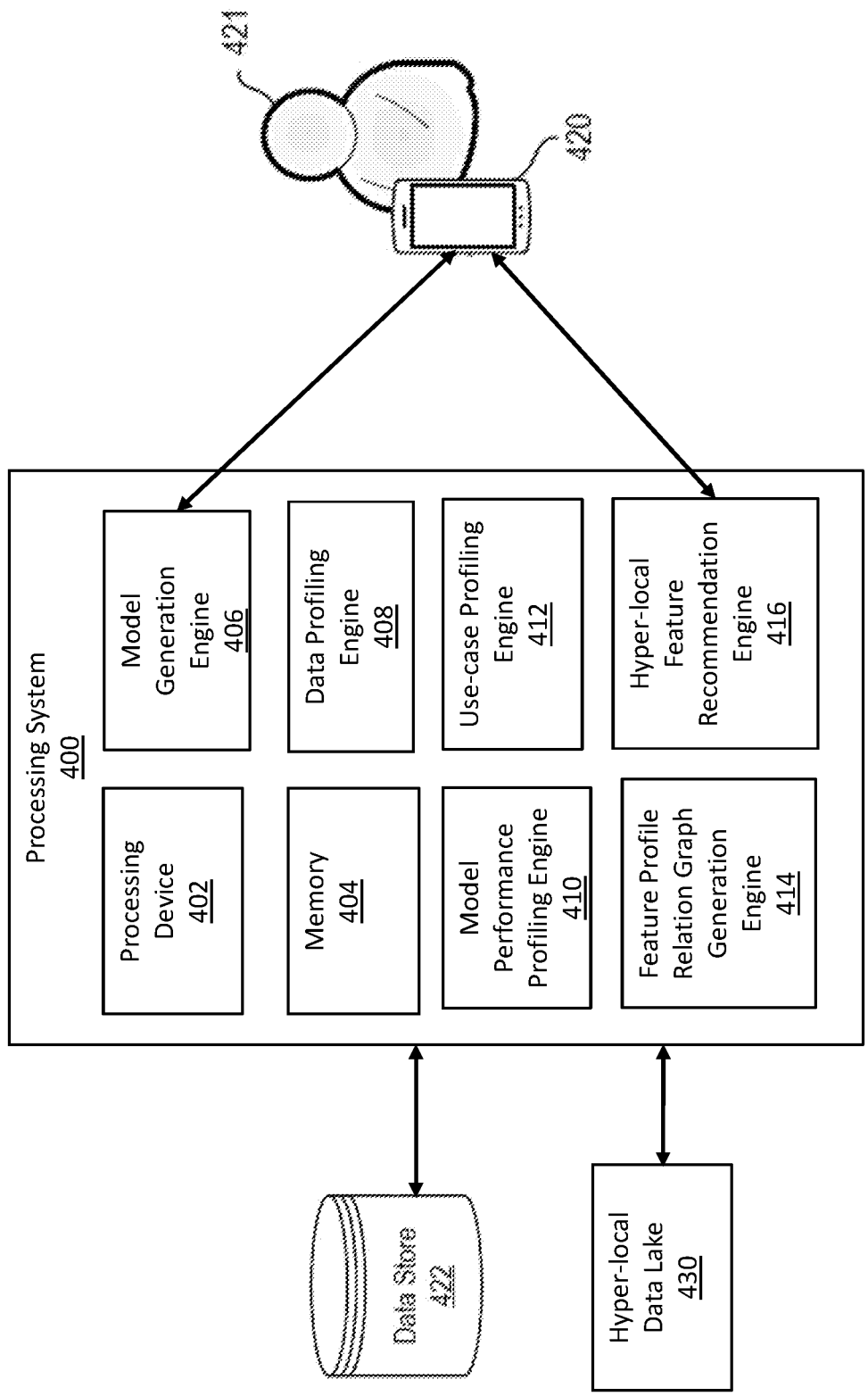
FIG. 4 depicts a system upon which provides automatic determination of recommended hyper-local data sources and features for use in modeling, according to one or more embodiments of the present invention.

FIG. 4 depicts a block diagram of a processing system 400 for providing automatic determination of recommended hyper-local data sources and features for use in modeling, according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 includes the processing device 402, the memory 404, a model generation engine 406, a data profiling engine 418, a model performance profiling engine 410, a use-case profiling engine 412, a feature profile relation graph generation engine 414 and a hyper-local feature recommendation engine 416. According to some embodiments, processing system 400 may be a workbench software platform. The processing system 400 can be configured to communicate with a user device 420, which may display data to and receive user inputs from a user 421. According to some embodiments, the processing system 400 may communicate with user device 420, data store 422 and hyper-local data lake 430 via communications network that may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, user devices 420 can include, but are not limited to, a smartphone, a wearable device such as a smartwatch, an augmented reality headset, a tablet, a smart speaker, a television, a computer system such as the one shown in FIG. 3, or any other suitable electronic device. The processing system may store and access data via a connected data store 422, and may also access and use hyper-local data provided via the hyper-local data lake 430. According to some embodiments, hyper-local data may be data that corresponds to a location or a locality, such as a city, a street, a corner block, a store, a neighborhood, a specific location on a map, or any other feasible granularity of location-associated data that may be collected and/or stored as part of the hyper-local data lake 430. For example, in various embodiments, hyper-local data may be data that pertains to an area that is approximately 1,000 square meters, 2,500 square meters, 5,000 square meters, 10,000 square meters, or any other size of area or areas as may be appropriate to cover one or more localities that may be of interest to a business or other organization seeking to make data-driven decisions. In some embodiments, hyper-local data lake 430 may be a set of databases in a workbench software platform where the hyperlocal data is stored.

The model generation engine 406 allows a user to build and train predictive models in relation to specified use-cases that fuse user-provided client data with hyper-local data sources made available by the processing system 400, for example, via the hyper-local data lake 430. As will be appreciated by those of skill in the art, predictive models may include for example, models that predict sales of products and services in various locations or models that determine how to distribute sales resources such as the locations of vending machines. The model generation engine 406 may be configured to allow a user to specify a desired granularity of location-based information (e.g., how many stores to put in a city vs. how many kiosks to put on a street). Granularity of location-based data can be managed using geo-hashing, which is a technique that can divide the world into high, medium and low level data (e.g., state vs. city vs. street). Features may similarly be broken into different levels of granularity (e.g., average income in the state vs. average income in a city vs. average income on a given street). In some embodiments, model generation engine 406 may train a model (e.g., using machine learning techniques) based on user-submitted client data, a description of a use-case and user-specified hyper-local data sources and features to train the model. According to some embodiments, processing system 400 may conduct an ongoing learning phase to learn the ties between hyper-local data features and discovered data/use-case profiles based on each instance of the training of a predictive model. The learning phase may include generating a data profile via the data profiling engine 408, evaluating the performance of the model via the model performance engine 410 and profiling the use-case via the use-case profiling engine as described further below. According to some embodiments, the result of the learning phase may be the construction of a feature profile relation graph, such as the example feature profile relation graph 500 shown in FIG. 5.

Figure 5:
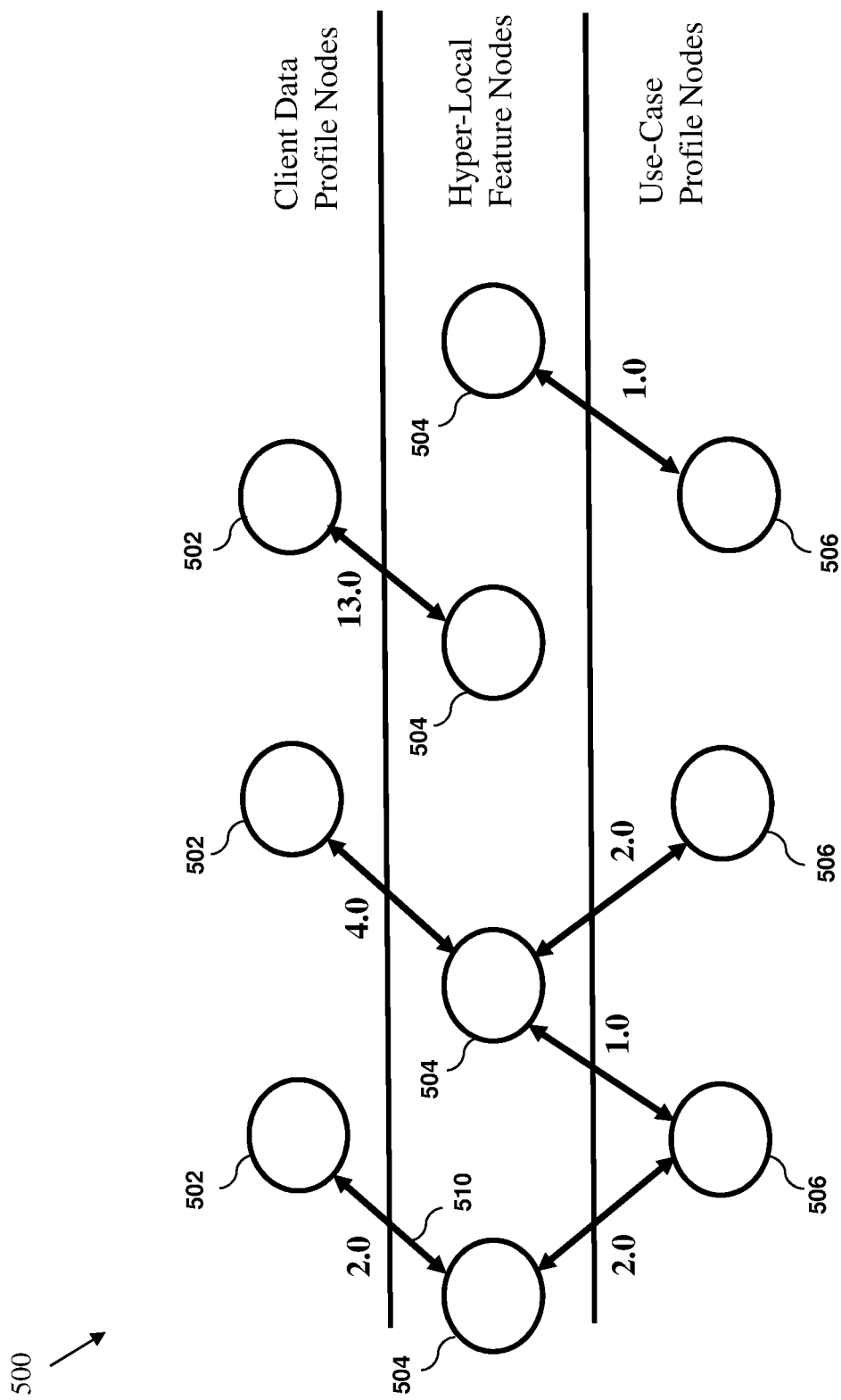
FIG. 5 depicts an example feature profile relation graph according to one or more embodiments of the present invention.

The data profiling engine 408 can be applied to any external data (e.g., client data) fed into the workbench software platform (i.e., processing system 400) to generate a data profile that includes one or more data profile vectors. The data profile may serve as a means of characterizing client data such that it may be compared to other client data (e.g., provided by other users in different models) to determine degrees of similarity between data sets. According to some embodiments, data profiling engine 408 may profile a client data set based on the text and associated metadata using natural language processing (NLP) techniques to build various profile vectors for the data. As will be appreciated by those of skill in the art, NLP techniques may be applied to the data set to determine the meaning and/or context of aspects of the data. According to some embodiments, such data profiling may be achieved by prefetching various keywords and phrases specific to various domains and categories that are used in building the profiling models and applying knowledge representation and reasoning to client data in view of the pre-fetched keywords to generate profile vectors. As will be appreciated by those of skill in the art, knowledge representation and reasoning is a field in artificial intelligence in which data is represented as a knowledge graph for various reasonings. For example, profile vectors may be neural word embeddings that can be generated using a process such as Word2Vec. As will be appreciated by those of skill in the art, Word2Vec is a two-layer neural network that processes text, receiving a text corpus as input and outputting a set of vectors that are feature vectors for the words in the corpus. According to some embodiments, the resulting data profile vectors may be used to determine the domain and/or category of the client data set. For example, domain and categories of the data may be represented as embeddings/vectors that enable various similarity measures. As used herein, a domain may refer to a high level categorization of goods and services such as for example, fashion, electronics, groceries, and the like, whereas a category may represent a more granular categorization of a given domain. For example, electronics may be a domain and categories may include televisions, cellular phones, speakers, laptops, and the like. As shown in FIG. 5, a data profile generated by data profile engine 408 may be represented as a client data profile node 502 in a feature profile relation graph 500 generated by feature profile relation graph generation engine 414.

The model performance profiling engine 410 may determine, based on the client data and hyper-local data sources used in a model, the features from the hyper-local data sources used in the model that contributed to the model performance. In other words, of the hyper-local data sources used in the model, the model performance profiling engine 410 may determine the impact on the model of each of the corresponding features. The impact or contribution that a feature has on the model may be referred to as the feature importance. According to some embodiments, the model performance profiling engine 410 may determine the relative feature importance of each feature to the model and may rank the features in order of importance. As will be appreciated by those of skill the art, the feature importance of features may be determined using feature selection algorithms, by penalizing features that are not very important by running different regularization methods such as Lasso or Ridge and zeroing out the coefficients of those parameters in the model, or by using any other techniques that are known or developed in the domain of Explainable Artificial Intelligence (AI), in which various known techniques exist that can be used to determine feature importance and/or understand which features dominate more in predictions and the like. As shown in FIG. 5, features having impact on one or more models may be represented as hyper-local feature nodes 504 in a feature profile relation graph 500 generated by feature profile relation graph generation engine 414. Each hyper-local feature node 504 may represent a different feature or a feature of a different level of granularity than another hyper-local feature node 504 of the same feature type. For example, a first hyper-local feature node 504 may represent "average income—city" whereas a second hyper-local feature node 504 may represent "average income—street."

The use-case profiling engine 412 generates a use-case profile based on a user-input natural text description of the use-case of the model. For example, a user may enter "determining locations of vending machines within a city" as a use-case of the model. As will be appreciated by those of skill in the art, semantic representation and comparison of natural language texts may be achieved by using a word representation that encodes similarity, utilizing techniques and tools such as distributional similarity-based representations, natural language interpretation, sentence encoding, bidirectional long short-term memory (BiLSTM) encoding, neural network word embedding (e.g., Word2Vec), convolutional neural networks, word vectors, and the like. Thus, according to some embodiments, a use-case profile may be represented as a vector or word embedding. As shown in FIG. 5, a use-case profile generated by data profile engine 408 may be represented as a use-case profile node 506 in a feature profile relation graph 500 generated by feature profile relation graph generation engine 414.

As described above, the feature profile relation graph generation engine 414 is configured to generate a feature profile relation graph 500 as illustrated in FIG. 5. The feature profile relation graph 500 may include a plurality of client data profile nodes 502, hyper-local feature nodes 504 and use-case profile nodes 506. A given hyper-local feature node 504 may be connected to or associated with a client data profile node 502 via an edge 510. A given hyper-local feature node 504 may be associated with a plurality of client data profile nodes 502, each via a respective edge. Similarly, a given hyper-local feature node 504 may be associated with one or more use-case profile nodes via respective edges. Each respective edge may have an associated edge weight (e.g., edge 510 has a weight of "2.0") that represents a strength of the relationship between the respective hyper-local feature node 504 and one of an associated client data profile node 502 or a user-case profile node 506. The edge weights are determined based on the feature importances determined by the model performance profiling engine 410 across various models. Thus, if a feature heavily impacts a model performance, that feature will be given more weight with respect to the relationship between the corresponding hyper-local feature node 504 and the associated client data profile node 502 and use-case profile node 506. Thus, the more frequent a relationship is observed across different models and the stronger the impact the feature has on the models, the more relative weight the respective edges will be given. In this way, the feature profile relation graph 500 may establish which features will have the biggest contribution to models having a particular client data profile and use-case profile. In some embodiments, the feature profile relation graph 500 may be continually or repeatedly updated with each new model that is generated using the workbench software platform. Once feature profile relation graph 500 has been generated or updated with data sufficient to show significant relationships between hyper-local feature nodes 504 and client data profile nodes 502 and/or use case profile nodes 506 (e.g., one or more edges has an edge weight that exceeds a predetermined threshold), the feature profile relation graph 500 may be used to automatically generate feature recommendations for new models.

The hyper-local feature recommendation engine 416 may be configured to automatically generate a recommendation of one or more hyper-local data sources and/or hyper-local features to be used in training a new model based on a new client data set and a use-case description provided by a user and the feature profile relation graph. According to some embodiments, the processing system 400 may discover the domain and/or category of the new client data set by applying performing data profiling (e.g., via data profiling engine 408) on the new client data and may determine the use-case of the new model by applying use-case profiling (e.g., via use-case profiling engine 412) to the use-case description. Based on the discovered or determined data profile and use-case profile, the hyper-local feature recommendation engine 416 may determine the top K hyper-local features that have the strongest ties to both the client data profile and the use-case profile. According to some embodiments, this may be achieved by identifying the hyper-local feature nodes 504 of the feature profile relation graph that have the strongest ties (i.e., highest edge weights) to client data profile nodes 502 and use-case profile nodes 506 that are most similar to the client data profile and the use-case profile associated with the new model. The similarity between the new client data profile and client data profile nodes 502 and similarity between the new use-case data profile and use-case profile nodes 506 may be determined by, for example, comparing the profile vectors generated during the profiling process to determine the degree of similarity between them. As will be appreciated by those of skill in the art, various similarity measures may be used to compare profile vectors, such as but not limited to, use of cosine distance or Euclidean distance.

As will be appreciated by those of skill in the art, in various embodiments different algorithms may be used to determine which hyper-local feature nodes have the highest ties to both the data profile and use-case profile of the new model. For example, in some embodiments, the client data profile node 502 that is most similar to the new client data profile and the use-case profile node 506 that is most similar to the new use-case profile may be identified, and each hyper-local feature node 504 that shares an edge with one or both of these two most similar nodes may be identified as being one of the top K hyper-local feature nodes 504. For each of these hyper-local feature nodes 504, the edge weight(s) of the edge(s) connecting to the most similar node(s) may be summed and the features may be ordered and ranked in order of which features have the highest total edge weight. According to some embodiments, instead of identifying a most similar node for each of the client data profile nodes 502 and the use-case profile nodes 506, the hyper-local feature recommendation engine 416 may instead identify a degree of similarity between the new client data profile and each client data profile node 502 and a degree of similarity between the new use-case profile and the use-case profile nodes 506 and perform a weighted summation of feature edges connecting to those nodes based on the weighting. For example, if the new client data profile is identical to a first client data profile node 502, the system may apply a weighting of "1" whereas if the new client data profile is only half similar to a second client data profile node 502 the system may apply a weighting of "0.5." Assuming both the first and second client data profile nodes 502 are connected to a given hyper-local feature node 504 by a first and second edge respectively, the system may then multiply the edge weight of the first edge by "1" and the edge weight of the second edge by "0.5" and sum them together to determine a score for the hyper-local feature node. It will be understood that such a procedure may determine scores for each hyper-local feature node 504 by performing a weighted summation of all edge weights, adjusted based on their respective weightings, for all edges of each hyper-local feature node 504. According to some embodiments, once the top K hyper-local features are identified, they may be provided to a user (e.g., via user device 420) to allow a user to make a selection of features to be used in generating the new model. According to some embodiments, processing system 400 may automatically select one or more of the top K hyper-local features for use in the model and automatically train and generate the model without further user input. In this way, the system may provide automatic guidance regarding what the best hyper-local features to use in generating a new model are, which can save a data scientist significant time and generate more accurate models.

Figure 6:
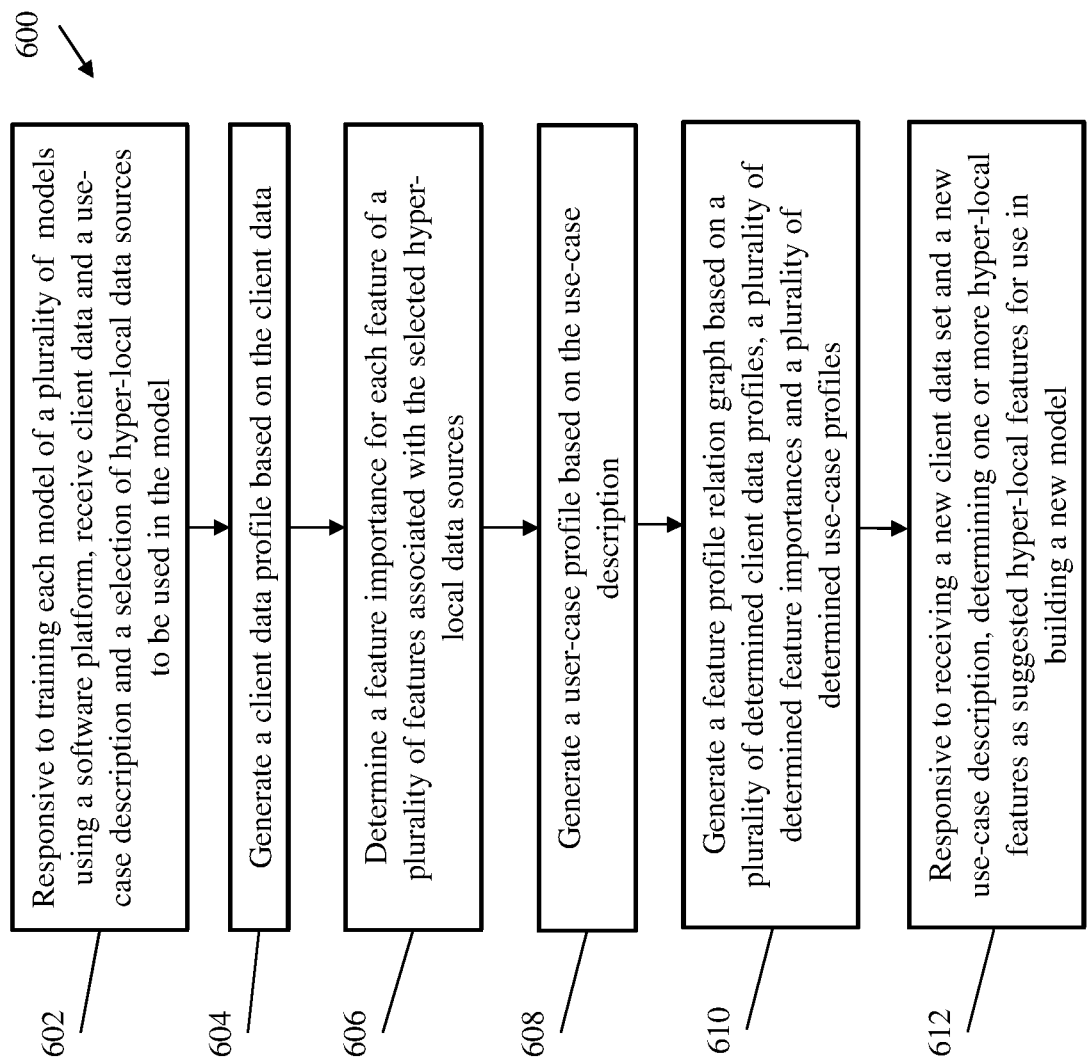
FIG. 6 depicts a flow diagram of a method for providing automatic determination of recommended hyper-local data sources and features for use in modeling according to one or more embodiments of the invention.

Turning now to FIG. 6, a flow diagram of a method 600 for providing automatic determination of recommended hyper-local data sources and features for use in modeling in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, processing system 400 described herein above and illustrated in FIG. 4, or in some other type of computing or processing environment.

The method 600 begins at block 602 and includes responsive to training each model of a plurality of models using a software platform, receiving (e.g., via processing system 400), client data, a use-case description and a selection of hyper-local data sources to be used in the model from a user associated with the model (e.g., via user device 420). According to some embodiments, the hyper-local data sources are accessible by the software platform. For example, the software platform may access data hyper-local data that pertains to a city block or an area of town that is approximately 5,000 square meters, or any such data set that is available on a locality. In some embodiments, processing system 400 may obtain hyper-local data from a hyper-local data lake 430. In some embodiments, processing system 400 may obtain various data (including geolocation data) via an application programming interface (API) that allows processing system 400 to obtain data from various public and/or third party data sources, such as U.S. census data, weather data, traffic data, foot traffic data, social network profile data, and the like.

According to some embodiments, the software platform may be a workbench software platform that is configured may permit a plurality of users to use the hyper-local data sources in modeling and restrict each user of the plurality of users to only use client data provided by the user in modeling. In some embodiments, the workbench software platform may be configured to prevent users from copying or exporting the hyper-local data to a location that is external to the software platform. However, a workbench software platform implementing the techniques described herein may nonetheless allow individual users to benefit from the collective insights obtained from generating a feature profile relation graph based on the differing models of all users of the workbench software platform. Thus, although a particular user may not have direct access to the client data, use-cases and model data provided by another user, a workbench software platform executed in accordance with embodiments of the disclosure may nonetheless allow all users to benefit from collective learning provided by the techniques described herein.

As shown at block 604, the method includes generating (e.g., via data profiling engine 408) a client data profile based on the client data. A client data profile may be generated for each model of a plurality of models in response to training each respective model. According to some embodiments, a client data profile may be represented as an n-dimensional vector.

As shown at block 606, the method includes determining (e.g., via model performance profiling engine 410) a feature importance for each feature of a plurality of features associated with the selected hyper-local data sources. A feature importance of a plurality of features associated with the selected hyper-local data sources may be determined for each model of the plurality of models in response to training each respective model.

As shown at block 608, the method includes generating (e.g., via use-case profiling engine 412) a use-case profile based on the use-case description. A use-case profile may be generated for each model of a plurality of models in response to training each respective model.

As shown at block 610, the method includes generating (e.g., via feature profile relation graph generation engine 414) a feature profile relation graph based a plurality of determined client data profiles (e.g., client data profiles generated with respect to a plurality of different models at block 604), a plurality of determined feature importances associated with features associated with hyper-local data sources (e.g. feature importances determined with respect to a plurality of different models at block 606), and a plurality of determined use-case profiles (e.g., use-case profiles generated with respect to a plurality of different models at block 608). According to some embodiments, the feature profile relation graph may include a plurality of client data profile nodes (e.g., corresponding to the plurality of determined client data profiles), a plurality of hyper-local feature nodes (e.g., corresponding to the plurality of determined feature importances) and a plurality of use-case profile nodes (e.g., corresponding to the plurality of determined use-case profiles). According to some embodiments, each node (i.e., client data profile nodes, hyper-local feature nodes and use-case nodes) may represent or be associated with various metadata such as one or more of textual details of the node, textual representation of the feature and vector representation of the features. Each hyper-local feature node may represent a particular feature of a hyper-local data source. As shown above in FIG. 5 and discussed previously above, according to some embodiments, each hyper-local feature node of the plurality of hyper-local feature nodes may be associated with one or more client data profile nodes and one or more user-case profile nodes by a respective edge having an associated edge weight.

According to some embodiments, a feature importance may represent a degree to which the respective feature contributes to the performance of the model. In some embodiments, each edge weight may be based on one or more feature importances associated with the respective hyper-local feature node and the edge weight may represent a strength of the relationship between the respective hyper-local feature node and one of an associated data profile node or a user-case profile node. For example, if 10 different models with similar client data profiles (or profile vectors) are trained using the software platform and 8 of them show a high level of feature importance for a particular feature, then the edge weight between that hyper-local feature node and the data profile node would be higher than it would be if only 3 of the 10 different models showed a high level of feature importance for the particular feature. Thus, when similar relations are observed from many different users (i.e., different models being trained using different data sets and use-cases), the corresponding edge weight may be increased to show the strong relationship between the hyper-local data feature and the data profiles. Accordingly, in some embodiments, a given edge may be assigned a higher relative edge weight based on determining that different models have similar relative feature importances associated with a given hyper-local feature node.

As shown at block 612, the method includes responsive to receiving a new client data set and a new use-case description, determining (e.g., via hyper-local feature recommendation engine 416) one or more hyper-local features as suggested hyper-local features for use in building a new model based on the new client data set, the new use-case description and the feature profile relation graph.

According to some embodiments, determining one or more hyper-local features as suggested hyper-local features for use in building a new model may include generating, based on the new client data, a new client data profile, determining a most similar client data profile node of the plurality of client data profile nodes of the feature profile relation graph based on the new client data profile, generating, based on the new use-case description, a new use-case profile, determining a most similar use-case profile node of the plurality of use-case profile nodes of the feature profile relation graph based on the new use-case profile, and determining suggested features based on one or more hyper-local feature nodes of the plurality of hyper-local feature nodes of the feature profile relation graph having the highest edge weights with the most similar client data profile node and the most similar use-case profile node. In other words, the processing system 400 may determine which hyper-local feature nodes 504 of a feature profile relation graph 500 have the edges with the highest weight that are connected to or associated with client data profile node(s) 502 and use-case profile node(s) 506 that are similar or most similar to the new client data profile and new use-case profile, respectively.

In some embodiments, the method may further include outputting the suggested hyper-local features for display to a user. For example, the suggested hyper-local features may be output to user device 420 for display to a user, and the user may select one or more of the suggested hyper-local features for use in training the new model. In some embodiments, the method may further include automatically initiating training of the new model based on the new client data set and the suggested hyper-local features. In this case, the system may automatically determine which hyper-local features to use and automatically train the model, thereby allowing for a user to create a model with little effort by merely inputting the client data and a description of the use-case.

According to some embodiments, the feature profile relation graph may be automatically updated in response to training the new model. Thus, in some embodiments, with every new model that is trained using the processing system 400, the process of profiling the client data, determining the importance of features on the model, and profiling the use-case may be repeated, and the feature profile relation graph may be updated to include the results by, for example, adding one or more new nodes and/or adjusting the edge weight of one or more previously existing nodes.

Additional processes may also be included. It should be understood that the process depicted in FIG. 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
responsive to training each model of a plurality of models using a software platform:
receiving, from a user associated with the model, client data, a use-case description comprising a user-input natural text description of an intended use-case of the model including an expected type of output from the model, and a selection of local data sources to be used in the model, wherein the local data sources are accessible by the software platform;
generating, based on the client data, a client data profile;
determining, for each feature of a plurality of features associated with the selected local data sources, a feature importance, wherein the feature importance indicates an impact that feature had on each of the plurality of models;
generating, based on the use-case description, a use-case profile comprising a vector embedding encoding the respective user-input natural text description;
generating, based on a plurality of determined client data profiles, a plurality of determined feature importances associated with features associated with local data sources, and a plurality of determined use-case profiles, a feature profile relation graph comprising a plurality of client data profile nodes, a plurality of local feature nodes and a plurality of use-case profile nodes, wherein each local feature node of the plurality of local feature nodes is associated with one or more client data profile nodes and one or more user-case profile nodes by a respective edge having an associated edge weight, wherein a given edge is assigned an edge weight that represents a strength of relationship between the respective local feature node and one of the client data profile nodes and the user-case profile nodes;

responsive to receiving a new client data set and a new use-case description comprising a new user-input natural text description of a new intended use-case, determining, based on the new client data set, the new use-case description and the feature profile relation graph, one or more local features as suggested local features for use in building a new model; and automatically initiating training of the new model based on the new client data set and the suggested local features.

2. The computer-implemented method of claim 1, wherein the software platform is a workbench software platform that is configured permit a plurality of users to use the local data sources in modeling and restrict each user of the plurality of users to only use client data provided by the user in modeling.

3. The computer-implemented method of claim 2, wherein the workbench software platform is configured to prevent users from copying or exporting the local data to a location that is external to the software platform.

4. The computer-implemented method of claim 1, wherein the feature profile relation graph is automatically updated in response to training the new model.

5. The computer-implemented method of claim 1, wherein a feature importance represents a degree to which the respective feature contributes to the performance of the model.

6. The computer-implemented method of claim 1, wherein each edge weight is based on one or more feature importances associated with the respective local feature node and represents a strength of the relationship between the respective local feature node and one of an associated client data profile node or a user-case profile node.

7. The computer-implemented method of claim 1, wherein determining one or more local features as suggested local features for use in building a new model comprises:
generating, based on the new client data, a new client data profile;
determining, based on the new client data profile, a most similar client data profile node of the plurality of client data profile nodes of the feature profile relation graph;
generating, based on the new use-case description, a new use-case profile;
determining, based on the new use-case profile, a most similar use-case profile node of the plurality of use-case profile nodes of the feature profile relation graph; and
determining suggested features based on one or more local feature nodes of the plurality of local feature nodes of the feature profile relation graph having the highest edge weights with the most similar client data profile node and the most similar use-case profile node.

8. The computer-implemented method of claim 1, further comprising outputting the suggested local features for display to a user.

9. A system comprising:
a processor communicatively coupled to a memory, the processor configured to:
responsive to training each model of a plurality of models using a software platform:
receive, from a user associated with the model, client data, a use-case description comprising a user-input natural text description of an intended use-case of the model including an expected type of output from the model, and a selection of local data sources to be used in the model, wherein the local data sources are accessible by the software platform;
generate, based on the client data, a client data profile;
determine, for each feature of a plurality of features associated with the selected local data sources, a feature importance, wherein the feature importance indicates an impact that feature had on each of the plurality of models;
generate, based on the use-case description, a use-case profile comprising a vector embedding encoding the respective user-input natural text description;
generate, based on a plurality of determined client data profiles, a plurality of determined feature importances associated with features associated with local data sources, and a plurality of determined use-case profiles, a feature profile relation graph comprising a plurality of client data profile nodes, a plurality of local feature nodes and a plurality of use-case profile nodes, wherein each local feature node of the plurality of local feature nodes is associated with one or more client data profile nodes and one or more user-case profile nodes by a respective edge having an associated edge weight, wherein a given edge is assigned an edge weight that represents a strength of relationship between the respective local feature node and one of the client data profile nodes and the user-case profile nodes;
responsive to receiving a new client data set and a new use-case description comprising a new user-input natural text description of a new intended use-case, determine, based on the new client data set, the new use-case description and the feature profile relation graph, one or more local features as suggested local features for use in building a new model; and
automatically initiating training of the new model based on the new client data set and the suggested local features.

10. The system of claim 9, wherein the software platform is a workbench software platform that is configured permit a plurality of users to use the local data sources in modeling and restrict each user of the plurality of users to only use client data provided by the user in modeling.

11. The system of claim 9, wherein the feature profile relation graph is automatically updated in response to training the new model.

12. The system of claim 9, wherein a feature importance represents a degree to which the respective feature contributes to the performance of the model.

13. The system of claim 9, wherein each edge weight is based on one or more feature importances associated with the respective local feature node and represents a strength of the relationship between the respective local feature node and one of an associated client data profile node or a user-case profile node.

14. The system of claim 9, wherein determining one or more local features as suggested local features for use in building a new model comprises:
generating, based on the new client data, a new client data profile;
determining, based on the new client data profile, a most similar client data profile node of the plurality of client data profile nodes of the feature profile relation graph;
generating, based on the new use-case description, a new use-case profile;
determining, based on the new use-case profile, a most similar use-case profile node of the plurality of use-case profile nodes of the feature profile relation graph;

determining suggested features based on one or more local feature nodes of the plurality of local feature nodes of the feature profile relation graph having the highest edge weights with the most similar client data profile node and the most similar use-case profile node; and automatically initiating training of the new model based on the new client data set and the suggested local features.

15. A computer program product comprising a computer readable storage medium having program instructions embodied therewith the program instructions executable by a computer processor to cause the computer processor to perform a method comprising:

responsive to training each model of a plurality of models using a software platform:
receiving, from a user associated with the model, client data, a use-case description comprising a user-input natural text description of an intended use-case of the model including an expected type of output from the model, and a selection of local data sources to be used in the model, wherein the local data sources are accessible by the software platform;
generating, based on the client data, a client data profile;
determining, for each feature of a plurality of features associated with the selected local data sources, a feature importance, wherein the feature importance indicates an impact that feature had on each of the plurality of models;
generating, based on the use-case description, a use-case profile comprising a vector embedding encoding the respective user-input natural text description;
generating, based on a plurality of determined client data profiles, a plurality of determined feature importances associated with features associated with local data sources, and a plurality of determined use-case profiles, a feature profile relation graph comprising a plurality of client data profile nodes, a plurality of local feature nodes and a plurality of use-case profile nodes, wherein each local feature node of the plurality of local feature nodes is associated with one or more client data profile nodes and one or more user-case profile nodes by a respective edge having an associated edge weight, wherein a given edge is assigned an edge weight that represents a strength of relationship between the respective local feature node and one of the client data profile nodes and the user-case profile nodes; and responsive to receiving a new client data set and a new use-case description comprising a new user-input natural text description of a new intended use-case, determining, based on the new client data set, the new use-case description and the feature profile relation graph, one or more local features as suggested local features for use in building a new model.

16. The computer program product of claim 15, wherein the software platform is a workbench software platform that is configured permit a plurality of users to use the local data sources in modeling and restrict each user of the plurality of users to only use client data provided by the user in modeling.

17. The computer program product of claim 15, wherein the feature profile relation graph is automatically updated in response to training the new model.

18. The computer program product of claim 15, wherein a feature importance represents a degree to which the respective feature contributes to the performance of the model.

* * * * *